(12) United States Patent
Lee et al.

(10) Patent No.: US 9,766,736 B2
(45) Date of Patent: Sep. 19, 2017

(54) LIQUID CRYSTAL DISPLAY DEVICE HAVING TOUCH AND THREE-DIMENSIONAL DISPLAY FUNCTIONS AND METHOD FOR MANUFACTURING THE SAME

(71) Applicant: LG DISPLAY CO., LTD., Seoul (KR)

(72) Inventors: So-Hyung Lee, Goyang-si (KR); Byung-Koo Kang, Paju-si (KR); Dong-Sup Kim, Seoul (KR); Jong-Hyun Han, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 98 days.

(21) Appl. No.: 14/823,297

(22) Filed: Aug. 11, 2015

(65) Prior Publication Data

US 2016/0034085 A1 Feb. 4, 2016

Related U.S. Application Data

(62) Division of application No. 13/715,316, filed on Dec. 14, 2012, now Pat. No. 9,141,223.

(30) Foreign Application Priority Data

Dec. 15, 2011 (KR) ........................ 10-2011-0135511

(51) Int. Cl.
*G02F 1/1335* (2006.01)
*G06F 3/041* (2006.01)
(Continued)

(52) U.S. Cl.
CPC ........... *G06F 3/0412* (2013.01); *G02B 27/22* (2013.01); *G02F 1/133* (2013.01);
(Continued)

(58) Field of Classification Search
CPC ................. G02F 1/133; G02F 1/13338; G02F 1/133528; G02F 1/133512; G06F 3/0412;
(Continued)

(56) References Cited

U.S. PATENT DOCUMENTS 5,759,643 A * 6/1998 Miyashita ............... C03C 17/42
428/1.31
2006/0197725 A1* 9/2006 Nam ................... H04N 13/0409
345/87

(Continued)

FOREIGN PATENT DOCUMENTS

CN 101881900 A 11/2010
CN 102053427 A 5/2011
(Continued)

OTHER PUBLICATIONS

Office Action issued in Chinese Application No. 201210544920.0, mailed Dec. 22, 2014, 13 pages.
(Continued)

*Primary Examiner* — Hoan C Nguyen
(74) *Attorney, Agent, or Firm* — Brinks Gilson & Lione

(57) ABSTRACT

Disclosed are a liquid crystal display device having touch and three-dimensional display functions and a method for manufacturing the same. The liquid crystal display device includes a touch and three-dimensional image display panel adhered to a liquid crystal panel through an adhesive layer, wherein the touch and three-dimensional image display panel includes a lower substrate provided with first and second electrodes for realizing a three-dimensional image, an upper substrate provided with third and fourth electrodes for sensing touch and a common electrode for realizing the three-dimensional image, and a liquid crystal display filled between the upper and lower substrates.

5 Claims, 30 Drawing Sheets

(51) Int. Cl.
*G02F 1/133* (2006.01)
*G02F 1/1333* (2006.01)
*G02B 27/22* (2006.01)
*G06F 3/044* (2006.01)

(52) U.S. Cl.
CPC .... *G02F 1/13338* (2013.01); *G02F 1/133512* (2013.01); *G02F 1/133528* (2013.01); *G06F 3/044* (2013.01); *G06F 2203/04103* (2013.01)

(58) Field of Classification Search
CPC ........... G06F 2203/04103; G06F 3/044; G02B 27/22
USPC .......................................................... 349/12
See application file for complete search history.

(56) References Cited

U.S. PATENT DOCUMENTS

2010/0035745 A1* 2/2010 Murata .................. C03C 3/083
501/66
2010/0157181 A1* 6/2010 Takahashi .......... G02B 27/2214
349/33
2010/0328239 A1* 12/2010 Harada ................. G06F 3/0412
345/173
2011/0096251 A1* 4/2011 Son ..................... G02F 1/13338
349/15

FOREIGN PATENT DOCUMENTS

| | | |
|---|---|---|
| CN | 102062965 A | 5/2011 |
| KR | 100824539 B1 | 4/2008 |
| WO | WO 2011125373 A1 | 10/2011 |

OTHER PUBLICATIONS

Office Action issued in corresponding Korean Patent Application No. 10-2011-0135511, mailed May 21, 2014, 5 pages.

* cited by examiner

LIQUID CRYSTAL DISPLAY DEVICE HAVING TOUCH AND THREE-DIMENSIONAL DISPLAY FUNCTIONS AND METHOD FOR MANUFACTURING THE SAME

This application is a Divisional of U.S. patent application Ser. No. 13/715,316 filed on Dec. 14, 2012, which claims the benefit of priority of Korean Patent Application No. 10-2011-0135511, filed on Dec. 15, 2011, which is hereby incorporated by reference as if fully set forth herein.

BACKGROUND

Field of the Disclosure

The present disclosure relates to a liquid crystal display device, and more particularly, to a liquid crystal display device having touch and three-dimensional image display functions, and a method for manufacturing the same.

Discussion of the Related Art

In keeping with dramatic advances in information technology, displays to visualize electronic information signals have been rapidly developed. Various slim, lightweight, and low-power flat display devices are commonly used as alternatives to conventional cathode ray tubes (CRTs).

Examples of flat display devices include liquid crystal displays (LCDs), plasma display panels (PDPs), field emission displays (FEDs), electroluminescent displays (ELDs) and the like. These flat display devices necessarily require a flat display panel to realize an image wherein the flat display panel has a structure in which a pair of transparent insulating substrates are joined such that an inherent luminous or polarized material layer is interposed between the substrates. Among flat display devices, liquid crystal display devices control light transmittance of liquid crystals using an electric field to display an image. For this purpose, an image display device includes a display panel including liquid crystal cells, a backlight unit to irradiate light to the display panel and a driving circuit to drive the liquid crystal cells.

The display panel is formed such that a plurality of gate lines cross a plurality of data lines to define a plurality of unit pixel regions. The display panel includes a thin film transistor array substrate and a color filter array substrate that face each other, a spacer interposed between the thin film transistor array substrate and the color filter array substrate to maintain a predetermined cell gap, and a liquid crystal inserted into the cell gap.

The thin film transistor array substrate includes a plurality of gate lines and a plurality of data lines, a thin film transistor formed as a switching device at each intersection between the gate line and the data line, a pixel electrode arranged in each liquid crystal cell and connected to the thin film transistor, and an orientation film coated on the resulting structure. The gate lines and data lines receive signals from driving circuits through respective pad portions.

In response to scan signals supplied to the gate lines, the thin film transistor transfers pixel voltage signals from the data lines to the pixel electrode.

In addition, the color filter array substrate includes color filters arranged in respective liquid crystal cells, a black matrix to partition the color filters and reflect external light, a common electrode to supply a reference voltage to the liquid crystal cells, and an orientation film coated on the resulting structure.

The thin film transistor substrate and the color filter array substrate thus separately formed are arranged and then joined such that the two substrates face each other, liquid crystal is injected into a region provided between the substrates and the region is sealed, thereby completing fabrication of the liquid crystal display device.

There is an increasing need for the liquid crystal display device thus fabricated including a touch panel, wherein a predetermined portion is touched by the hand or a separate input means and separate data can be transferred in response to the touch, and a three-dimensional image display panel to display a three-dimensional image. The touch panel and the three-dimensional image display panel are applied to the liquid crystal display by adhering the same to the outer surface of the liquid crystal display.

A conventional liquid crystal display wherein a touch panel and a three-dimensional image display panel are mounted on a liquid crystal display device will be described with reference to the annexed drawings.

FIG. 1 is a sectional view illustrating a conventional liquid crystal display device including a touch panel and a three-dimensional image display panel.

As shown in FIG. 1, the conventional liquid crystal display device including the touch panel and the three-dimensional image display panel broadly includes a liquid crystal panel 50, a three-dimensional image display panel 60 and a touch panel 70 formed in this order from the bottom. The liquid crystal panel 50, the three-dimensional image display panel 60 and the touch panel 70 are adhered to one another through a first adhesive layer 55 and a second adhesive layer 65. Here, the first and second adhesive layers 55 and 65 comprise double-sided adhesives.

The liquid crystal panel 50 includes first and second substrates 10 and 20 that face each other, a liquid crystal layer 25 filled between the first and second substrates 10 and 20, color filter layers 21 (21a, 21b, 21c) formed on the second substrate 20, and a first polarizing plate 31 and a second polarizing plate 32 formed on the outer surfaces of the first and second substrates 10 and 20.

Also, the three-dimensional image display panel 60 includes a third substrate 41 provided with electrodes made of a transparent material, a fourth substrate 42 provided with a black matrix layer (not shown), and a liquid crystal layer 45 filled between the third and fourth substrates.

An inner configuration of the touch panel layer 70 is changed into various forms according to driving mode of the touch panel.

The conventional liquid crystal display device including a touch panel and a three-dimensional image display panel have the following problems.

First, as described above, the three-dimensional image display panel and the touch panel are adhered to the liquid crystal display device through an adhesive, thus increasing a thickness and a weight of the liquid crystal display.

Second, the respective panels should be adhered through an adhesive, thus making the overall manufacture process complicated.

Third, the respective panels use separate substrates and the overall process is complicated, thus increasing manufacture costs.

SUMMARY

A liquid crystal display device includes a touch and three-dimensional image display panel adhered to a liquid crystal panel through an adhesive layer, wherein the touch and three-dimensional image display panel includes: a lower substrate provided with first and second electrodes for realizing a three-dimensional image; a upper substrate provided with third and fourth electrodes for sensing touch and a common electrode for realizing the three-dimensional image; and a liquid crystal display filled between the upper and lower substrates.

In another aspect of the present invention, provided is a method for manufacturing a liquid crystal display device including a touch and three-dimensional image display panel adhered to a liquid crystal panel through an adhesive layer, the method including: forming first and second routing lines for realizing a three-dimensional image on a lower substrate of the touch and three-dimensional image display panel; forming a first protective film over the entire surface of the lower substrate including the first and second routing lines and forming a plurality of first contact holes in the first routing line; forming a plurality of first electrodes on the first protective film such that the first electrodes are electrically connected to the first routing line through the first contact holes; forming a second protective film over the entire surface of the lower substrate including the first electrodes and forming a plurality of second contact holes in the second routing line; forming a plurality of second electrodes on the second protective film such that the second electrodes are electrically connected to the second routing line through the second contact holes; forming third and fourth routing lines for sensing touch on an upper substrate of the touch and three-dimensional image display panel; forming a plurality of bridges on the upper substrate to connect electrodes arrayed in an X-axis direction; forming a third protective film over the entire surface of the substrate and forming a plurality of third contact holes in the third and fourth routing lines and the bridges; forming X- and Y-axial electrodes on the third protective film such that the X- and Y-axial electrodes are connected to the third and fourth routing lines and the bridges through the third contact holes; forming a fourth protective film over the entire surface of the substrate; forming a common electrode for realizing the three-dimensional image on the fourth protective film; and joining the upper substrate and the lower substrate such that the upper substrate faces the lower substrate, and forming a liquid crystal layer between the upper substrate and the lower substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EXEMPLARY EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

The liquid crystal display device having touch and three-dimensional display functions and a method for manufacturing the same according to the present invention will be described in more detail with reference to the annexed drawings.

First Embodiment

Figure 1:
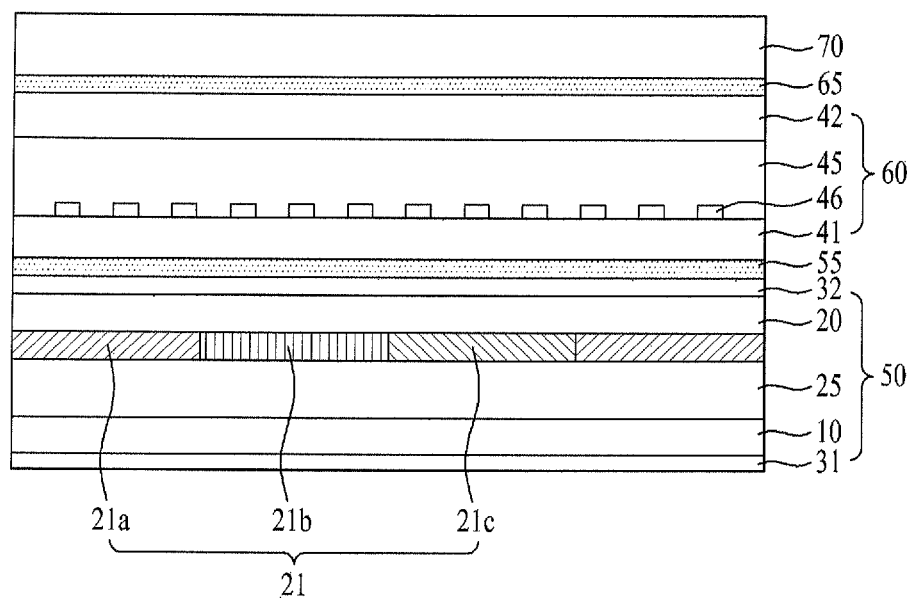
FIG. 1 is a sectional view illustrating a conventional liquid crystal display device including a touch panel and a three-dimensional image display panel.
Figure 2:
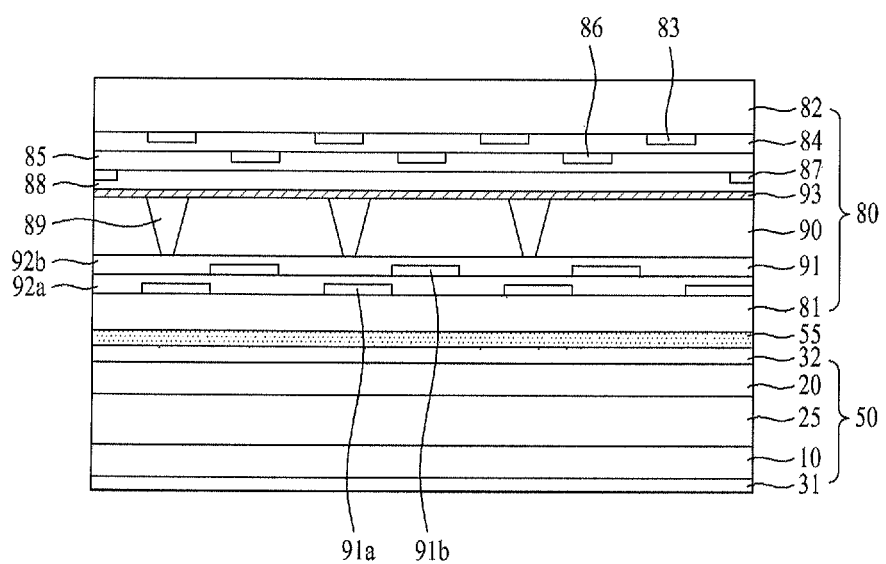
FIG. 2 is a sectional view illustrating a configuration of a liquid crystal display device having touch and three-dimensional display functions according to a first embodiment of the present invention.

FIG. 2 is a sectional view illustrating a configuration of a liquid crystal display device having touch and three-dimensional display functions according to a first embodiment of the present invention.

As shown in FIG. 2, the liquid crystal display device having touch and three-dimensional display functions according to a first embodiment of the present invention broadly includes a liquid crystal panel 50 and a touch and three-dimensional image display panel 80 formed in this order from the bottom, and the liquid crystal panel 50 is adhered to the touch and three-dimensional image display panel 80 through an adhesive layer 55. Here, the adhesive layer 55 is a double-sided adhesive agent.

Like a conventional liquid crystal panel, the liquid crystal panel 50 includes first and second substrates 10 and 20 facing each other, a liquid crystal layer 25 filled between the first and second substrates 10 and 20, a color filter layer formed on the second substrate 20, and a first polarizing plate 31 and a second polarizing plate 32 formed on the outer surfaces of the first and second substrates 10 and 20, respectively.

Also, the touch and three-dimensional image display panel 80 includes a third substrate (lower substrate) 81 provided with electrodes 91a and 91b made of a transparent material for realizing a three-dimensional image, a fourth substrate (upper substrate) 82 provided with electrodes 83 and 86 made of a transparent material for sensing touch and a black matrix layer 87, and a liquid crystal layer 90 filled between the third and fourth substrates. Here, the fourth substrate 82 is formed of a hardened glass substrate.

The touch and three-dimensional image display panel 80 includes a plurality of electrodes 83 (Rx) for sensing touch formed on the fourth substrate 82, a protective film 84 formed over the entire surface of the fourth substrate 82 including the plurality of electrodes 83, and a plurality of electrodes 86 (Tx) for sensing touch formed on the protective film 84. Here, the electrodes 83 and 86 for sensing touch may be realized with various methods.

The touch and three-dimensional image display panel 80 includes a protective film 85 formed on the protective film 84 including the electrodes 86, a black matrix layer 87 formed on the protective film 85, an over-coating layer 88 formed on the protective film 85 including the black matrix layer 87, a transparent common electrode 93 to realize a three-dimensional image formed on the over-coating film 88, an insulating film (not shown) formed over the entire surface of the common electrode 93, and a column spacer 89 formed on the insulating film.

A plurality of electrodes 91a and 91b to realize a three-dimensional image and protective films 92a and 92b are formed on the third substrate 81 of the touch and three-dimensional image display panel 80.

The third substrate 81 and the fourth substrate 82 thus formed are joined to each other through a sealant (not shown) such that they face each other and a liquid crystal layer 90 is formed between the third and fourth substrates.

The third substrate 81 of the touch and three-dimensional image display panel 80 and the liquid crystal panel 50 are adhered to each other through the adhesive 55.

A method for manufacturing a liquid crystal display device having touch and three-dimensional display functions according to the first embodiment of the present invention will be described in detail.

FIG. 3A to 3E are a plan view and a sectional view illustrating the method for manufacturing the liquid crystal display device having touch and three-dimensional display functions according to the first embodiment of the present invention, and specifically, a plan view and a sectional view illustrating a process of a lower substrate (third substrate) of the touch and three-dimensional image display panel.

Figure 3A:
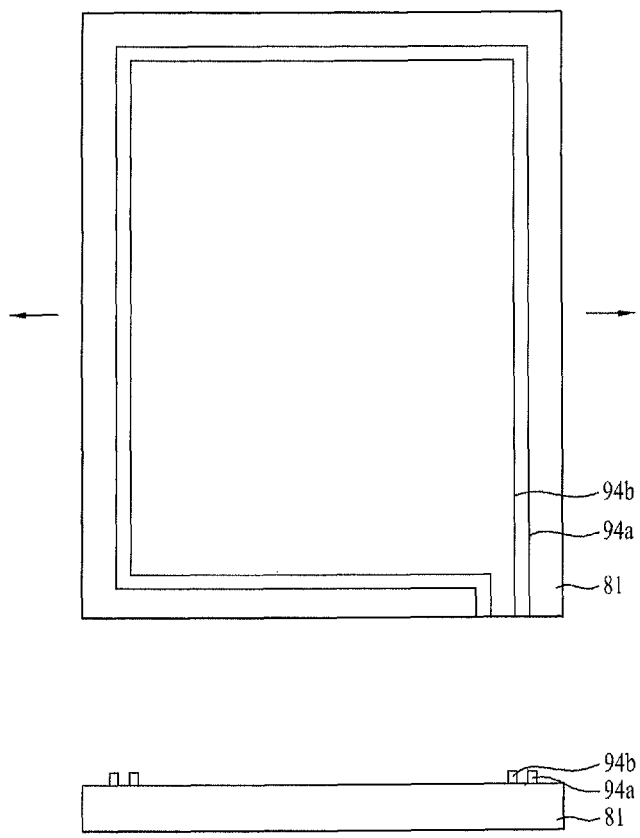
FIG. 3A to 3E are a plan view and a sectional view illustrating a method for manufacturing the liquid crystal display device having touch and three-dimensional display functions according to the first embodiment of the present invention, and specifically, a plan view and a sectional view illustrating a process of a lower substrate (third substrate) of the touch and three-dimensional image display panel.

As shown in FIG. 3A, routing lines 94a and 94b to realize three-dimensional images are formed on the edge of the third substrate 81 of the touch and three-dimensional image display panel 80.

Figure 3B:
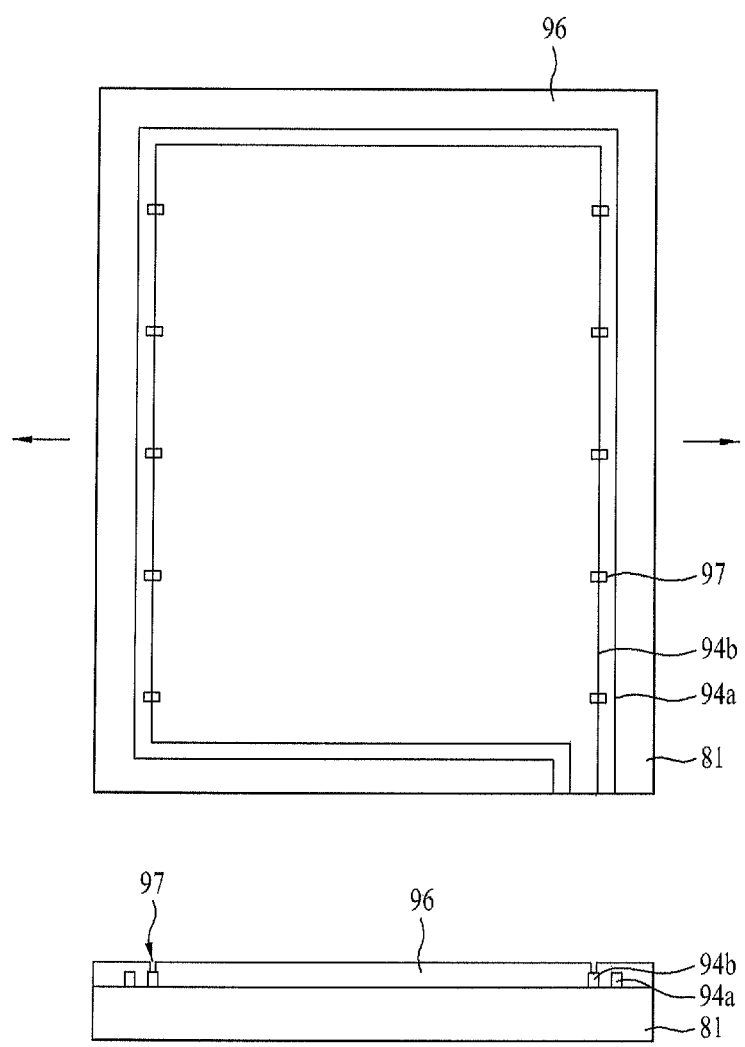

As shown in FIG. 3B, a protective film 96 is formed over the entire surface of the third substrate 81 including the routing lines 94a and 94b and is then selectively removed, to form a plurality of contact holes 97 in one routing line 94b of the routing lines 94a and 94b.

Figure 3C:
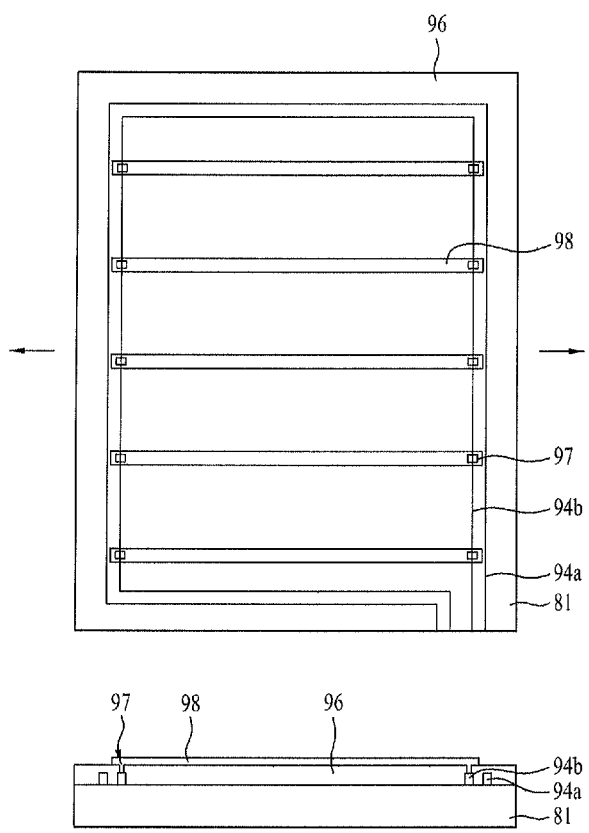

As shown in FIG. 3C, a transparent conductive layer is deposited on the protective film 96 including the plurality of contact holes 97 and is selectively removed to form a plurality of even electrodes 98 such that the even electrodes 98 are electrically connected to the routing line 94b through the contact holes 97.

Figure 3D:
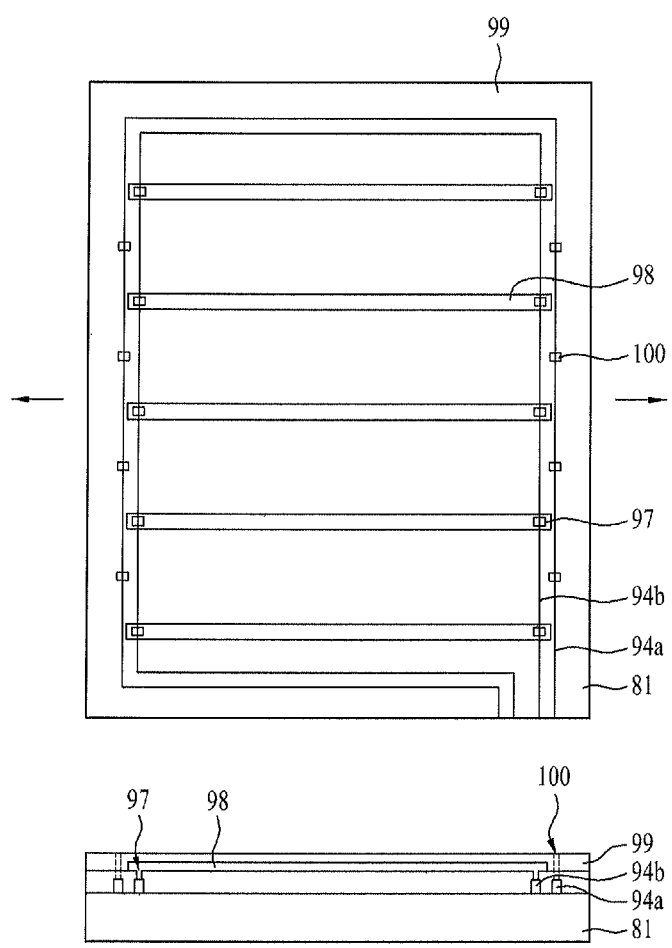

As shown in FIG. 3D, a protective film 99 is formed over the entire surface of the protective film 96 including the even electrodes 98 and the protective film 99 is selectively removed through an etching process using a mask to form a plurality of contact holes 100 in the routing line 94a.

Figure 3E:
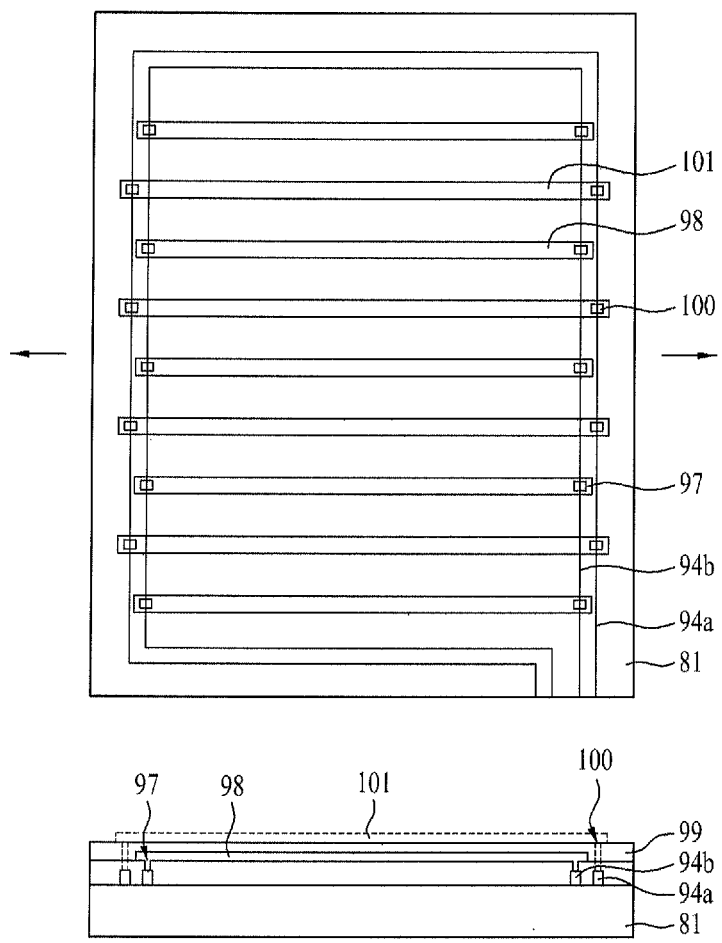

As shown in FIG. 3E, a transparent conductive layer is deposited over the protective film 99 including the contact holes 100 and is selectively removed to form a plurality of odd electrodes 101 such that the odd electrodes 101 are electrically connected to the routing line 94a through the contact holes 100. Also, an insulating film (not shown) is formed over the resulting structure.

Although not shown, after the protective films are formed and the contact holes are then formed, pad portions of the routing lines are exposed.

Also, a method for manufacturing an upper substrate (fourth substrate) of the touch and three-dimensional image display panel will be described in detail.

FIGS. 4A to 4E are a plan view and a sectional view illustrating a method for manufacturing the liquid crystal display device having touch and three-dimensional display functions according to the first embodiment and specifically, are a plan view and a sectional view illustrating a process of the upper substrate (fourth substrate) of the touch and three-dimensional image display panel.

Figure 4A:
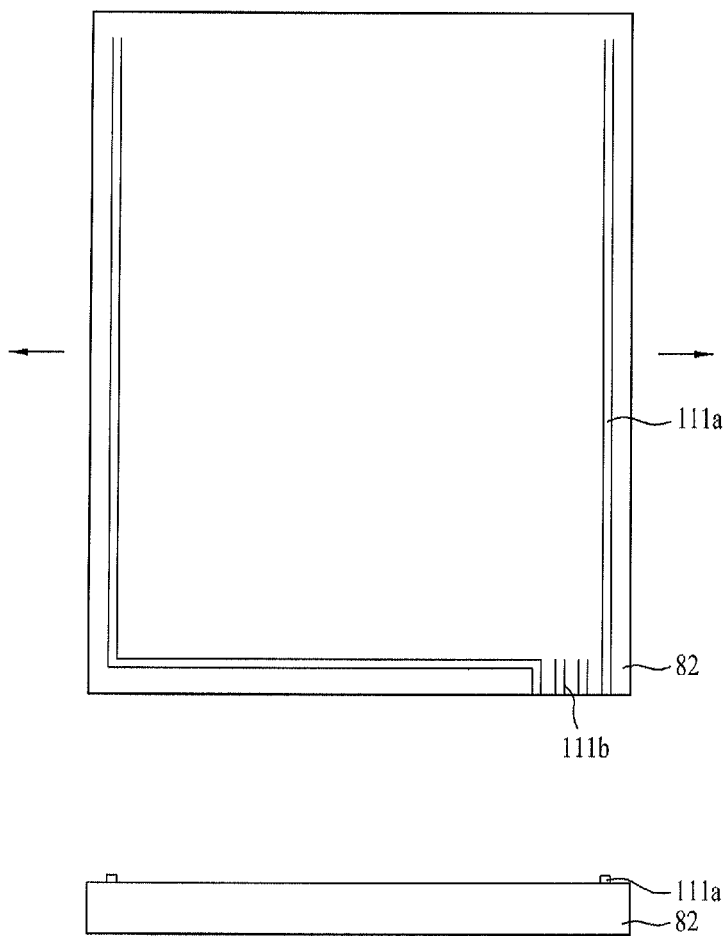
FIGS. 4A to 4E are a plan view and a sectional view illustrating a method for manufacturing the liquid crystal display device having touch and three-dimensional display functions according to the first embodiment and specifically, are a plan view and a sectional view illustrating a process of an upper substrate (fourth substrate) of the touch and three-dimensional image display panel.

As shown in FIG. 4A, routing lines 111a and 111b for sensing touch are formed on the edge of the fourth substrate 82 of the touch and three-dimensional image display panel 80.

Figure 4B:
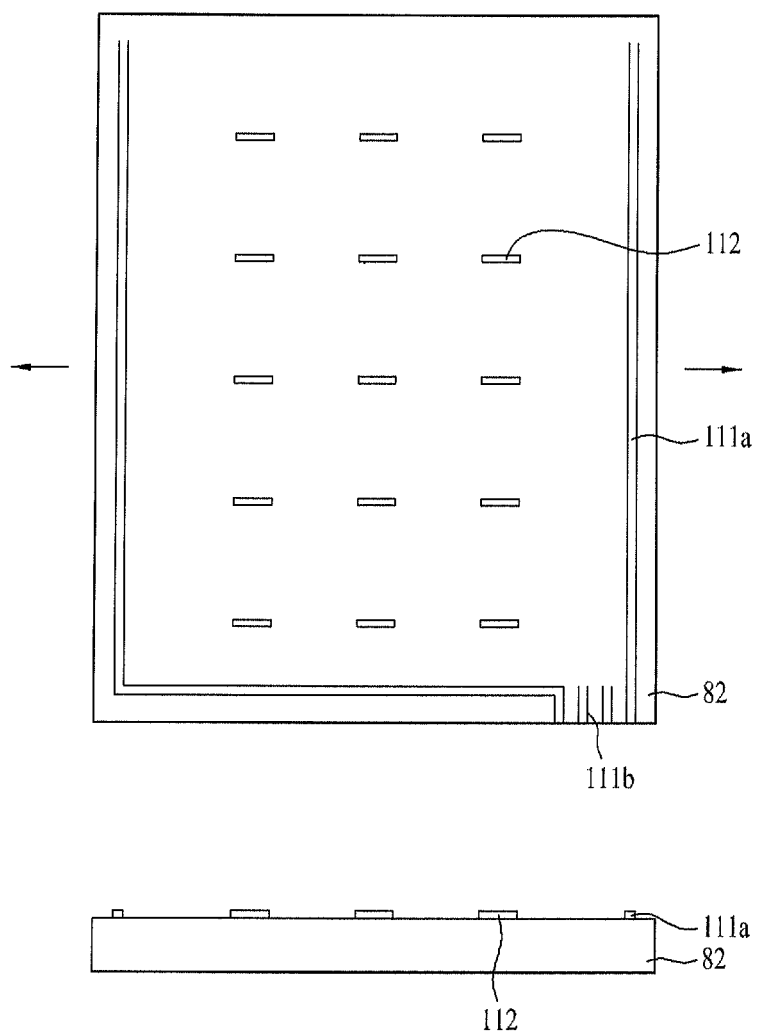

As shown in FIG. 4B, a transparent conductive layer is deposited on the fourth substrate 82 and is selectively removed to form a plurality of bridges 112 to connect electrodes arrayed in an X axis.

Figure 4C:
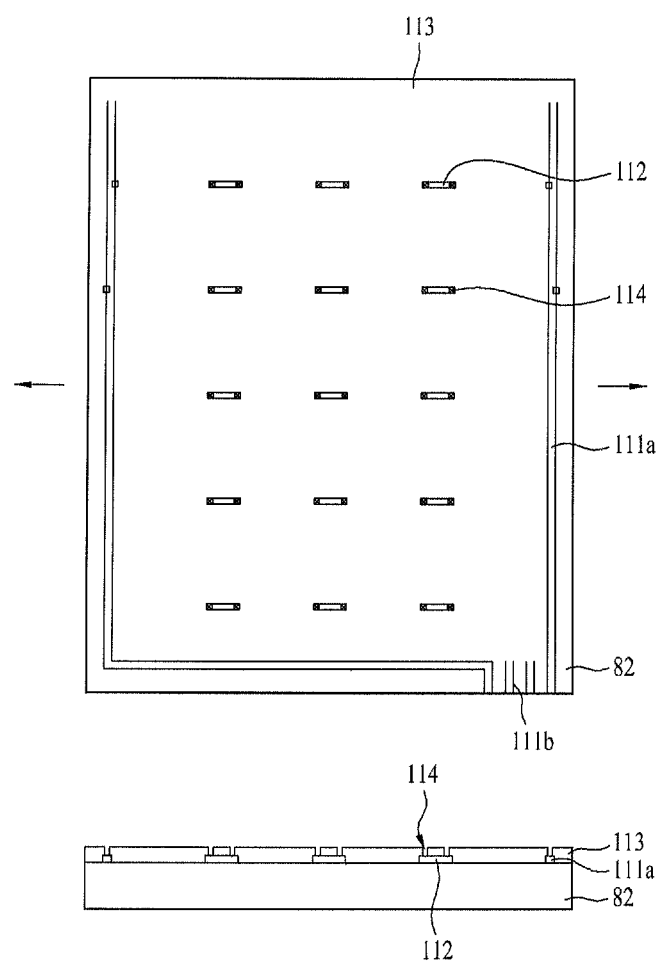

As shown in FIG. 4C, a protective film 113 is formed over the entire surface of the fourth substrate 82, and the protective film 113 is selectively removed through an etching process using a mask to form a plurality of contact holes 114 in the routing lines 111a and 111b and the bridges 112.

As shown in FIG. 4C, a transparent conductive layer is deposited over the entire surface of the protective film 113 to form a plurality of X- and Y-axial electrodes 115 and 116. Here, the X-axial electrodes 115 are connected to one another through the bridges 112. The X-axial electrodes 115 are connected to the routing lines 111a, and the Y-axial electrodes 116 are connected to the routing lines 111b.

Figure 4D:
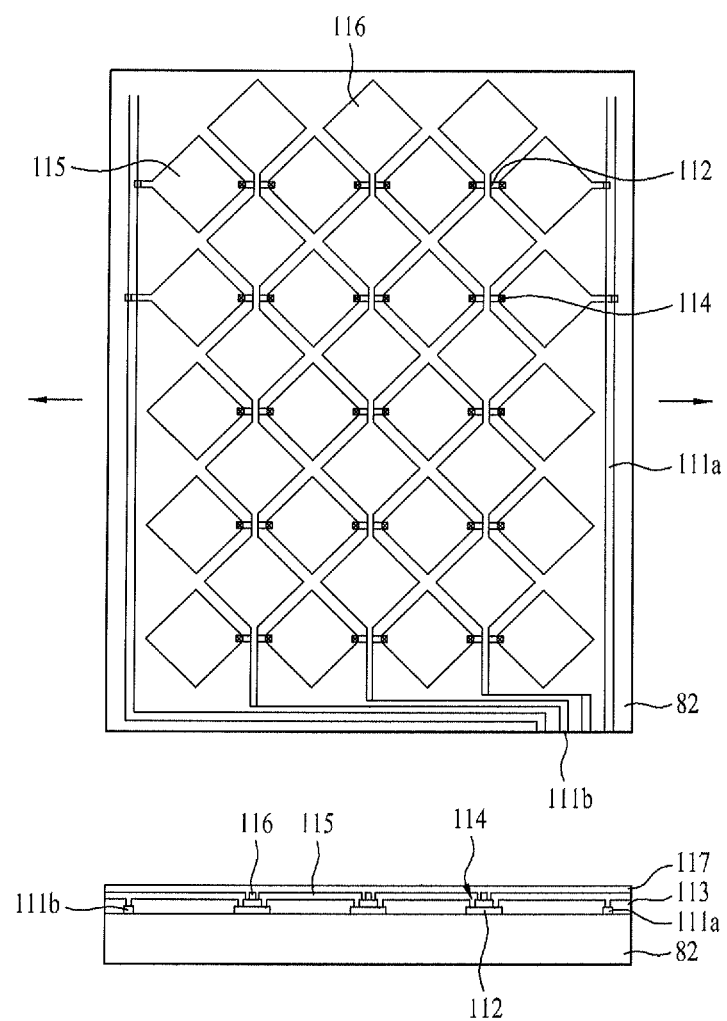

Although an example in which the X- and Y-axial electrodes 115 and 116 are formed in the same layer is illustrated in FIG. 4D, the present invention is not limited to this example, the electrodes (represented by reference numerals "83" and "86" in FIG. 2) may be formed in different layers, as shown in FIG. 2. That is, FIG. 2 illustrates a configuration in which the X-axial electrode is isolated from the Y-axial electrode through the protective film and FIG. 4D illustrates a configuration in which the X-axial and Y-axial electrodes are formed in the same layer and the X-axial electrodes are connected to one another through the bridges. In the present invention, the both cases may be used and other electrode patterns may be also used.

Also, a protective film 117 is formed over the entire surface of the substrate including the X-axial electrodes 115 and the Y-axial electrodes 116.

FIG. 2 illustrates a configuration in which the electrodes 83 and 86 for sensing touch are formed as a double layer structure and FIG. 4 illustrates a configuration in which the electrodes 115 and 116 for sensing touch are formed in the same layer. The reason for this is that the electrodes for sensing touch may be formed by various methods depending on a resistant film method or a capacitive method.

Figure 4E:
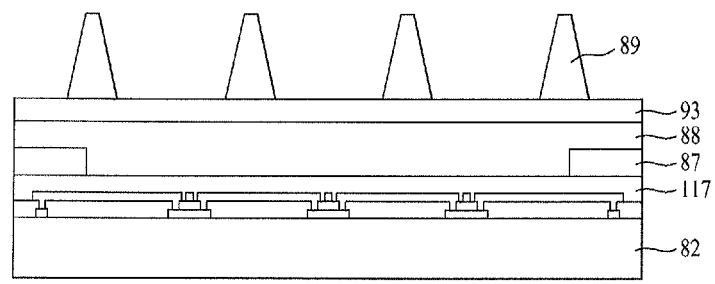

As shown in FIG. 4E, a black matrix layer 87 is formed on the protective film 117.

An over-coating layer 88 is formed on the fourth protective film 117 including the black matrix layer 87, a transparent common electrode 93 to realize a three-dimensional image is formed on the over-coating film 88, an insulating film (not shown) is formed over the entire surface of the transparent common electrode 93, and a column spacer 89 is formed on the insulating film.

Similarly, although not shown, after protective films are formed and the contact holes are then formed, the pad portion of the routing lines is exposed.

The third substrate 81 and the fourth substrate 82 thus formed are joined to each other using a sealant (not shown) such that the third substrate 81 faces the fourth substrate 82, and a liquid crystal layer 90 is formed between the third and fourth substrates to complete formation of the touch and three-dimensional image display panel.

Also, the touch and three-dimensional image display panel is adhered to the liquid crystal panel through an adhesive.

According to the first embodiment, the black matrix layer 87 is formed on the touch electrode, but the present invention is not limited thereto.

Second Embodiment

Figure 5:
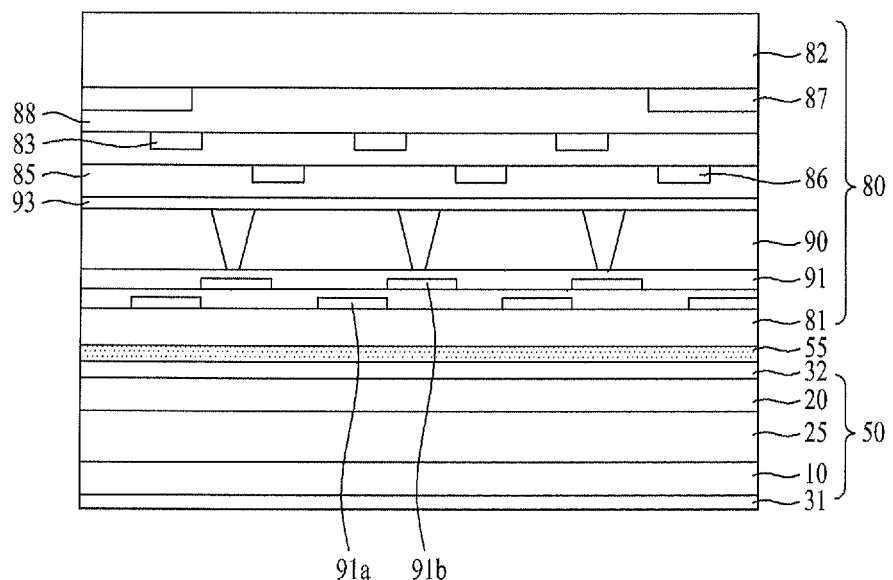
FIG. 5 is a sectional view illustrating a configuration of a liquid crystal display device having touch and three-dimensional display functions according to a second embodiment of the present invention.

FIG. 5 is a sectional view illustrating a configuration of a liquid crystal display device having touch and three-dimensional display functions according to a second embodiment of the present invention.

Before formation of the X- and Y-axial electrodes for sensing touch, a black matrix layer 87 is formed on the fourth substrate 82, and touch electrodes and a common electrode are sequentially formed thereon.

That is, as shown in FIG. 5, a black matrix layer 87 is formed on the fourth substrate 82 of the touch and three-dimensional image display panel 80, an over-coating layer 88 is formed on the fourth substrate 82 including the black matrix layer 87, X-axial (first) electrodes 83 (Rx) for sensing touch is formed, a first protective film 84 is formed over the over-coat layer 88 including the third electrodes 83, and Y-axial (second) electrodes 86 (Tx) for sensing touch are formed on the first protective film 84. Here, the first and second electrodes for sensing touch may be realized by various methods.

A second protective film 85 is formed on the first protective film 84 including the second electrode 86, a transparent common electrode 93 to realize a three-dimensional image is formed on the second protective film 85, an insulating film (not shown) is formed over the entire surface of the common electrode 93, and a column spacer 89 is formed on the insulating film.

The configuration of the third substrate is the same as in FIG. 2 illustrating the first embodiment of the present invention.

Third Embodiment

Meanwhile, the touch electrode and the electrode for displaying a three-dimensional image may be formed on the same substrate. Such a configuration will be described in detail below.

Figure 6:
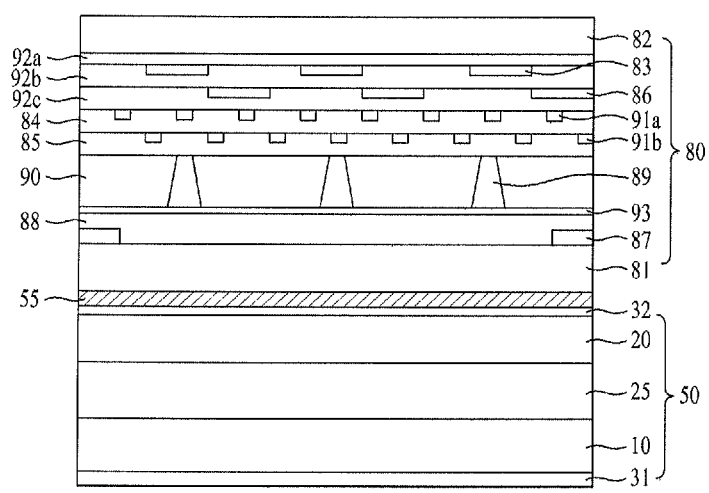
FIG. 6 is a sectional view illustrating a configuration of a liquid crystal display device having touch and three-dimensional display functions according to a third embodiment of the present invention.

FIG. 6 is a sectional view illustrating a configuration of a liquid crystal display device having touch and three-dimensional display functions according to a third embodiment of the present invention.

First, as shown in FIG. 6, the liquid crystal display device having touch and three-dimensional display functions according to the third embodiment of the present invention broadly includes a liquid crystal panel 50, and a touch and three-dimensional image display panel 80 arranged in this order from the bottom, and the liquid crystal panel 50 is adhered to the touch and three-dimensional image display panel 80 through an adhesive layer 55. Here, the adhesive layer 55 comprises a double-sided adhesive.

Like a conventional liquid crystal panel, the liquid crystal panel 50 includes first and second substrates 10 and 20 facing each other, a liquid crystal layer 25 filled between the first and second substrates 10 and 20, a color filter layer formed on the second substrate 20, and a first polarizing plate 31 and a second polarizing plate 32 formed on outer surfaces of the first and second substrates 10 and 20, respectively.

Also, the touch and three-dimensional image display panel 80 includes a fourth substrate (upper substrate) 82 provided with electrodes 83 and 86 for sensing touch, and electrodes 91a and 91b for displaying three-dimensional images, a third substrate 81 provided with a black matrix layer 87 and a common electrode 93, and a liquid crystal layer 90 filled between the third and fourth substrates 81 and 82. Here, the fourth substrate 82 may be a tempered glass substrate.

A black matrix layer 87 is formed on the third substrate 81, an over-coating layer 88 is formed over the entire surface of the substrate including the black matrix layer 87, a transparent common electrode 93 for displaying a three-dimensional image is formed on the over-coating film 88, and a column spacer 89 is formed on the common electrode 93.

Electrodes 83 and 86 for sensing touch are formed on the fourth substrate 82 of the touch and three-dimensional image display panel 80, and electrodes 91a and 91b for displaying three-dimensional images are formed on the electrodes 83 and 86. In this case, the respective electrodes 83, 86, 91a and 91b are electrically isolated from one another through protective films 92a, 92b, 92c, 84, and 85. Here, the electrodes for sensing touch may be realized by various methods, as shown in FIGS. 2 and 4.

The third substrate 81 and the fourth substrate 82 thus formed are joined to each other through a sealant (not shown) such that the third substrate 81 faces the fourth substrate 82, and the liquid crystal layer 90 is formed between the third and fourth substrates.

The third substrate 81 of the touch and three-dimensional image display panel 8 is adhered to the liquid crystal panel 50 through the adhesive 55.

The method for manufacturing the liquid crystal display device having touch and three-dimensional display functions according to the third embodiment of the present invention will be described in detail.

FIGS. 7A to 7I are a plan view and a sectional view illustrating the liquid crystal display device having touch and three-dimensional display functions according to the third embodiment of the present invention and are a plan view and a sectional view illustrating the process of the fourth substrate (upper substrate) of the touch and three-dimensional image display panel.

Figure 7A:
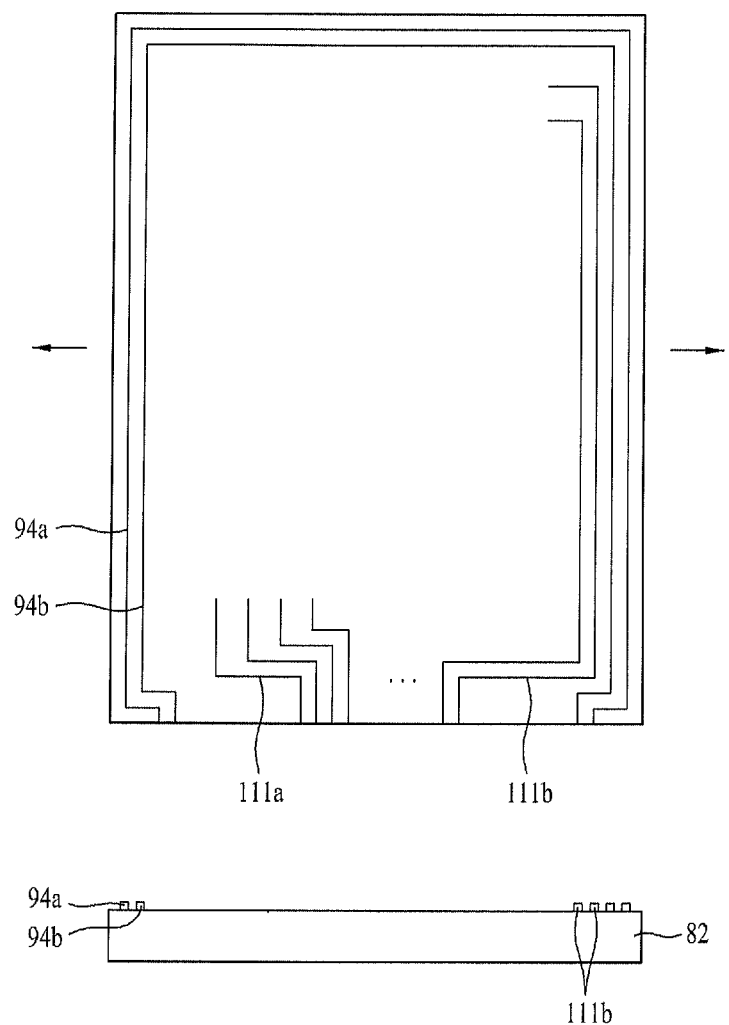
FIGS. 7A to 7I are a plan view and a sectional view illustrating the liquid crystal display device having touch and three-dimensional display functions according to the third embodiment of the present invention, and specifically, are a plan view and a sectional view illustrating a process of a fourth substrate (upper substrate) of the touch and three-dimensional image display panel.

As shown in FIG. 7A, routing lines 94a and 94b for realizing three-dimensional images and X- and Y-axial routing lines 111a and 111b for sensing touch are formed on an edge of the fourth substrate 82 of the touch and three-dimensional image display panel 80.

Figure 7B:
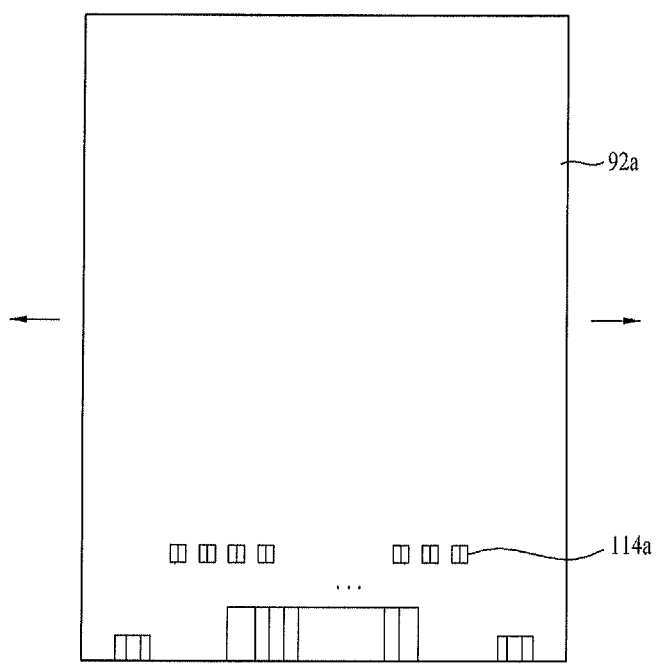
Figure 7B:
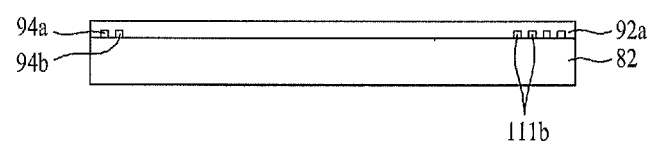

As shown in FIG. 7B, a protective film 92a is formed over the entire surface of the fourth substrate 82 including the routing lines 94a, 94b, 111a and 111b, and the protective film 92a is then selectively removed through an etching process using a mask, to form a plurality of contact holes 114a in the Y-axial routing line 111a among the routing lines 111a and 111b for sensing touch.

Figure 7C:
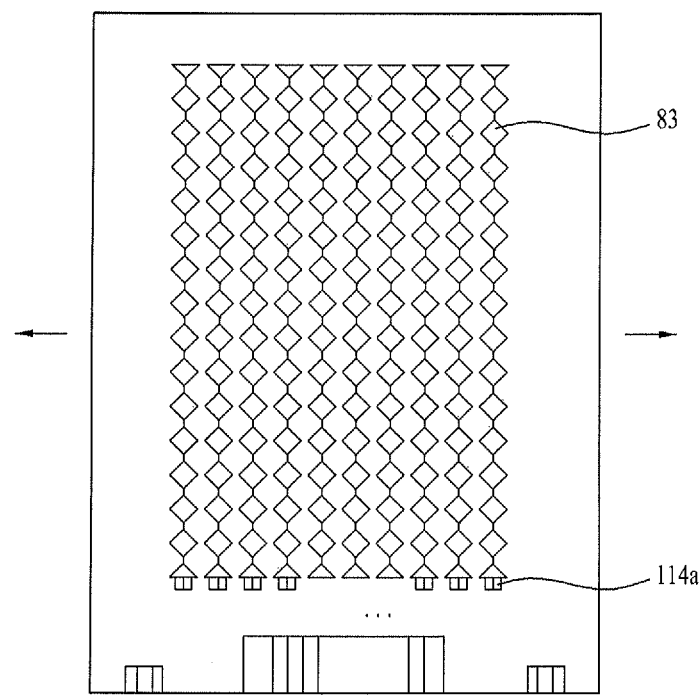
Figure 7C:
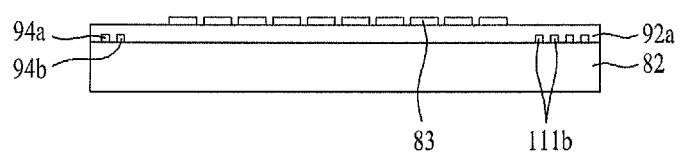

As shown in FIG. 7C, a transparent conductive layer is deposited over the entire surface of the protective film 92a including the plurality of contact hole 114a and is then selectively removed, to form a plurality of electrodes 83 (Rx) for sensing touch such that the electrode 83 are electrically connected to the Y-axial routing lines 111a through the contact holes 114a.

Figure 7D:
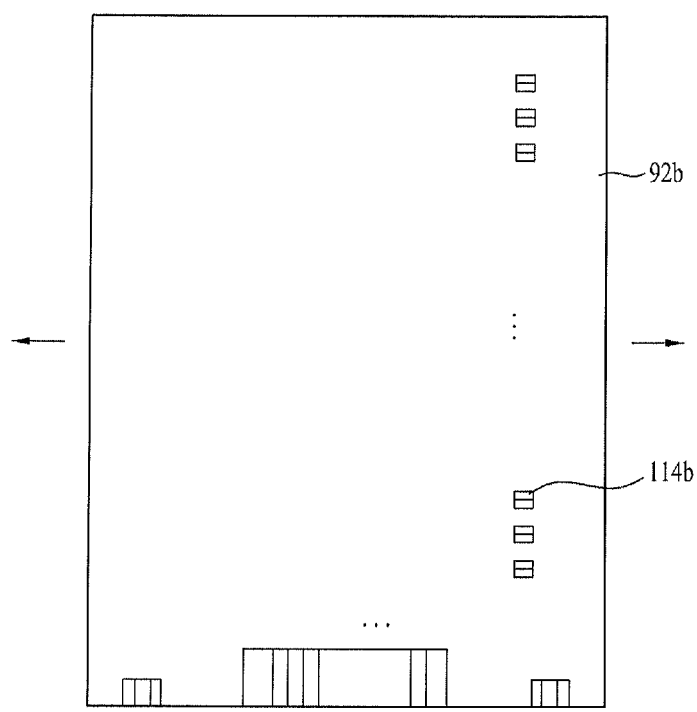
Figure 7D:
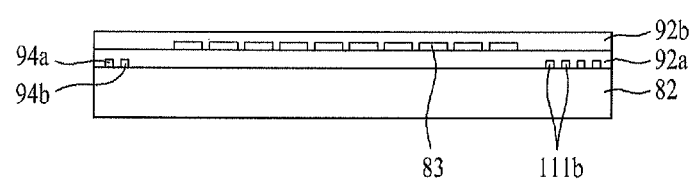

As shown in FIG. 7D, a protective film 92b is formed over the entire surface of the substrate and is then selectively removed through an etching process using a mask the protective film 92b to form a plurality of contact holes 114b in the X-axial routing line 111b among the routing lines 111a and 111b.

Figure 7E:
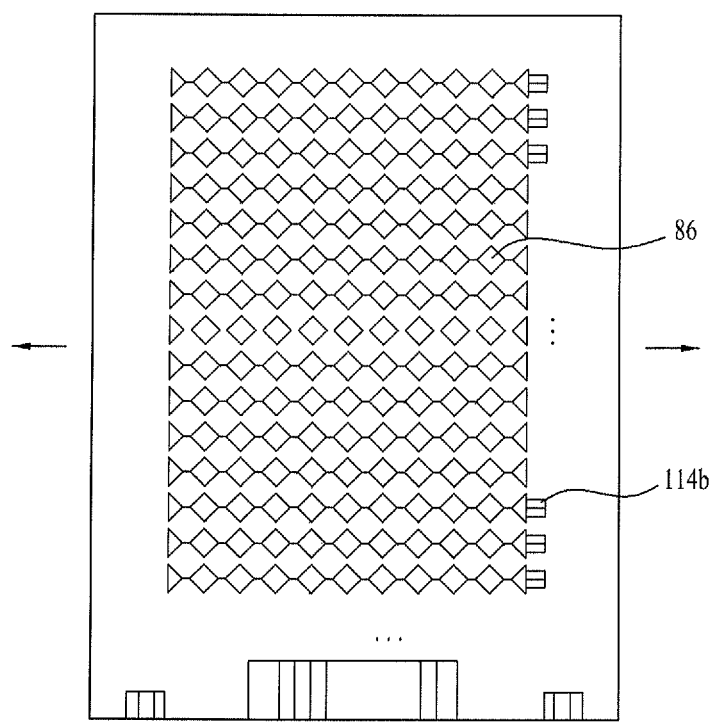
Figure 7E:
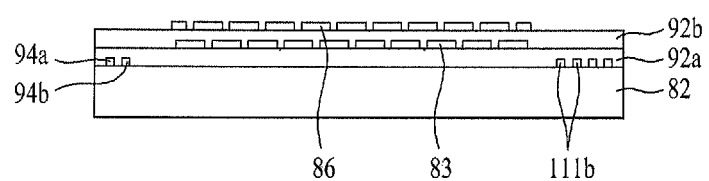

As shown in FIG. 7E, a transparent conductive layer is deposited on the protective film 92b and is selectively patterned to form electrodes 86 (Tx) for sensing touch such that the electrode 86 are electrically connected to the X-axial routing lines 111b through the contact holes 114b.

Figure 7F:
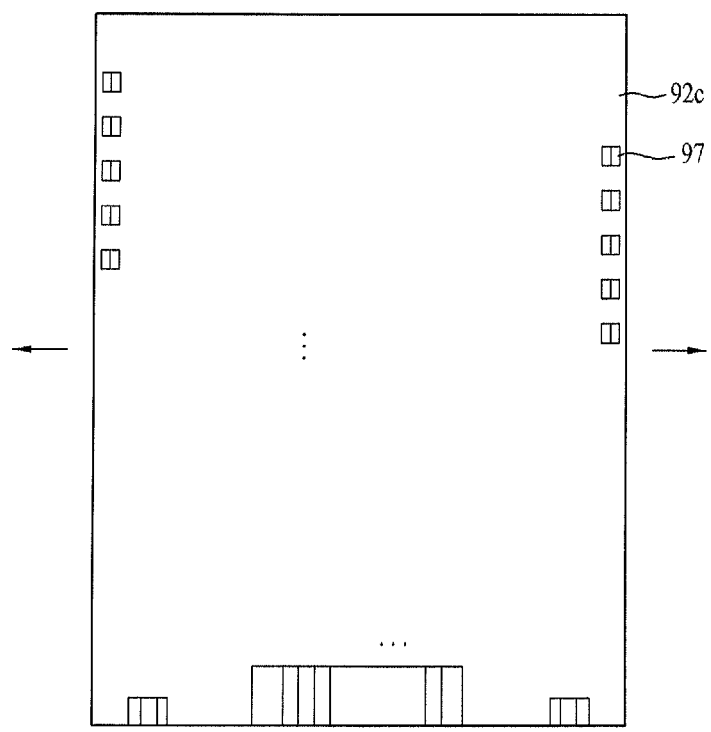
Figure 7F:
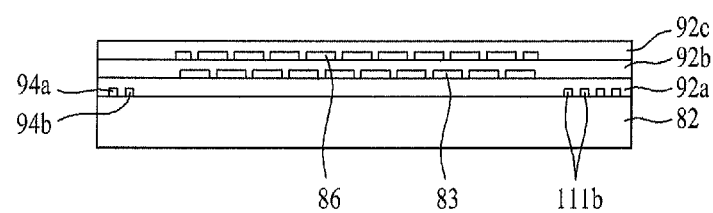

As shown in FIG. 7F, a protective film 92c is formed over the entire surface of the substrate including the electrodes 86 and is then selectively removed through an etching process using a mask the protective film 92c to form a plurality of contact holes 97 on the routing line 94a among the routing lines 94a and 94b for displaying the three-dimensional image.

Figure 7G:
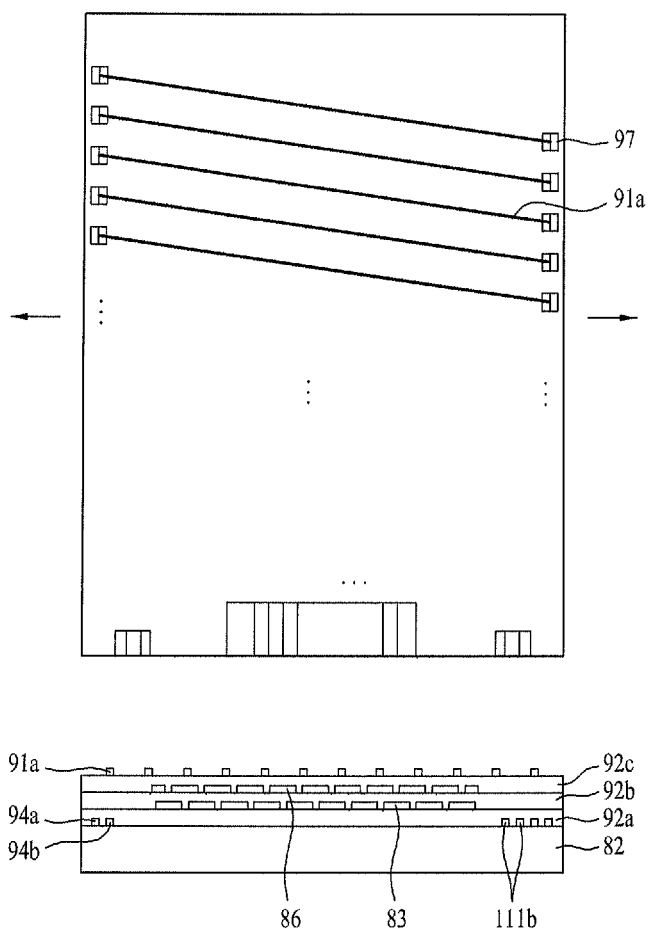

As shown in FIG. 7G, a transparent conductive layer is deposited on the protective film 92c and is then selectively removed, to form a plurality of even electrodes 91a such that the even electrodes are electrically connected to the routing line 94a through the contact hole 97.

Figure 7H:
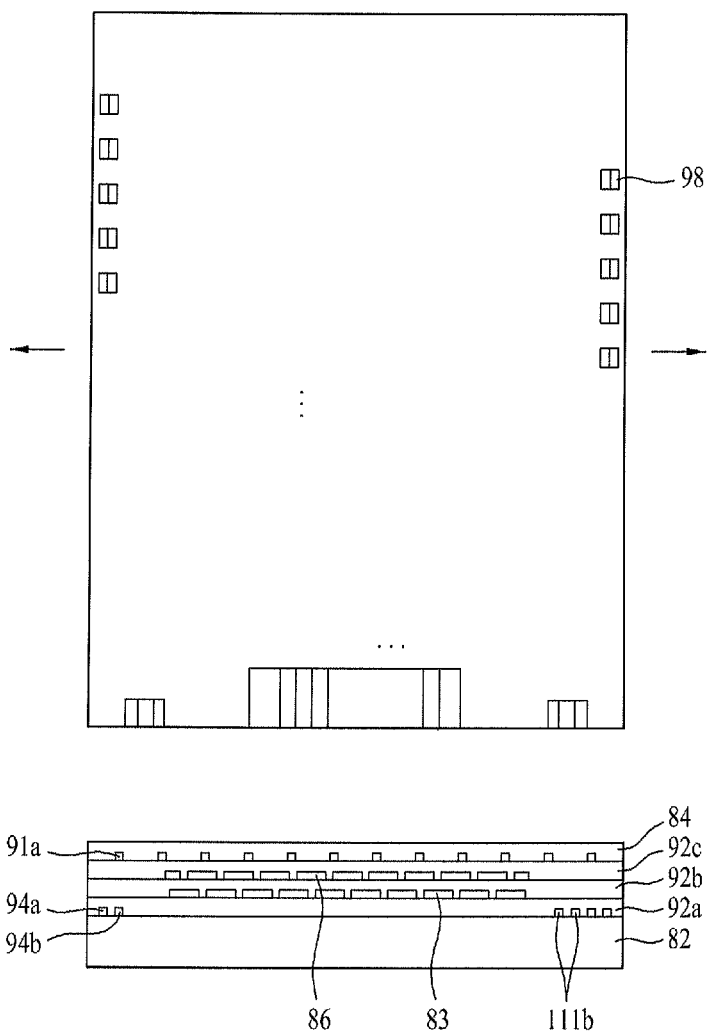

As shown in FIG. 7H, a protective film 84 is formed over the entire surface of the protective film 92c including the even electrodes 91a and is then selectively removed through an etching process using a mask to form a plurality of contact holes 98 in the routing line 94b.

Figure 7I:
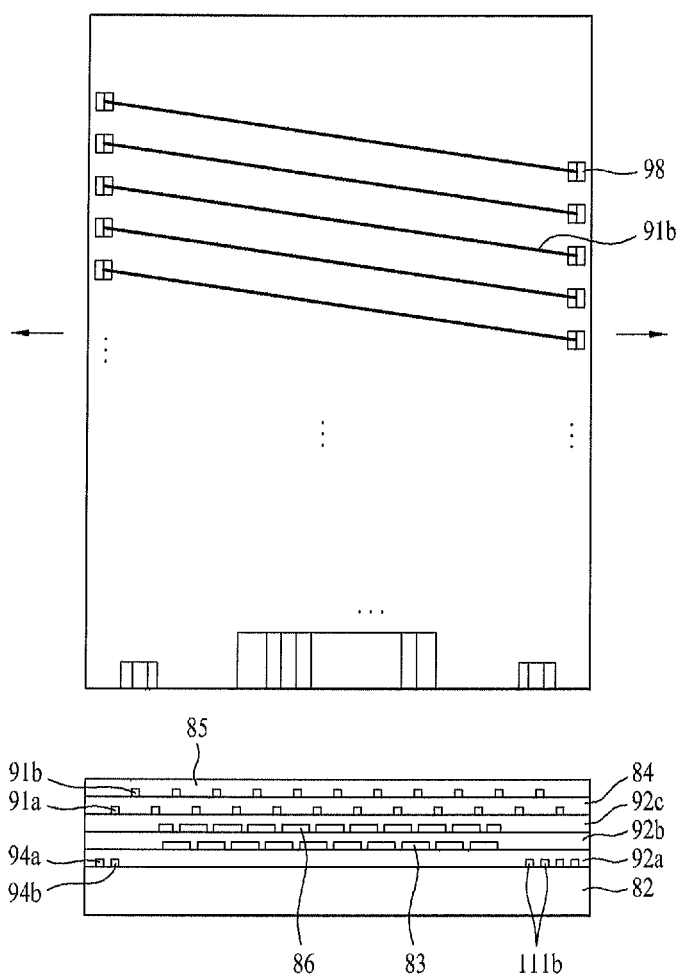

As shown in FIG. 7I, a transparent conductive layer is deposited over the protective film 84 including the contact holes 98 and is then selectively removed, to form a plurality of odd electrodes 91b such that the odd electrodes 91b are electrically connected through the contact holes 98 to the routing line 94b. Also, a protective film 85 is formed over the entire surface of the resulting structure.

Similarly, although not shown, after the protective films are formed and the contact holes are then formed, the pad portion of the routing lines is exposed.

Also, as shown in FIG. 6, a black matrix layer 87 is formed on the third substrate 81 of the touch and three-dimensional image display panel, an over-coating layer 88 is formed over the third substrate 81 including the black matrix layer 87, a transparent common electrode 93 for realizing a three-dimensional image is formed over the over-coating layer 88 and a column spacer 89 is formed on the common electrode 93.

The third substrate 81 and the fourth substrate 82 thus are joined to each other using a sealant (not shown) such that the third substrate 81 faces the fourth substrate 82, and a liquid crystal layer 90 is formed between the third and fourth substrates 81 and 82 to complete formation of the touch and three-dimensional image display panel.

Also, the touch and three-dimensional image display panel 8 is adhered to the liquid crystal panel 95 through an adhesive 55.

Fourth Embodiment

Narrow bezel models having a narrow bezel region, excluding a pixel array region, in order to make the pixel array region displaying an image wide as possible at a predetermined size are being introduced.

A configuration of the liquid crystal display device having touch and three-dimensional display functions and a method for manufacturing the same, which are suitable for realization of the narrow bezel as described above will be described in detail.

Figure 8:
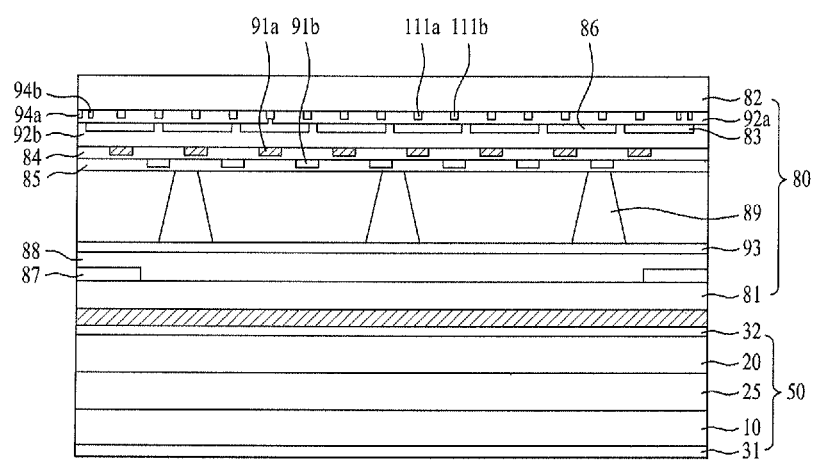
FIG. 8 is a sectional view illustrating a configuration of a liquid crystal display device having touch and three-dimensional display functions according to a fourth embodiment.

FIG. 8 is a sectional view illustrating a configuration of a liquid crystal display device having touch and three-dimensional display functions according to the fourth embodiment.

First, as shown in FIG. 8, the liquid crystal display device having touch and three-dimensional display functions according to the fourth embodiment broadly includes a liquid crystal panel 50 and a touch and three-dimensional image display panel 80 disposed in this order from the bottom, and the liquid crystal panel 50 is adhered to the touch and three-dimensional image display panel 80 through an adhesive layer 55. Here, the adhesive layer 55 comprises a double-sided adhesive.

Like a conventional liquid crystal panel, the liquid crystal panel 50 includes first and second substrates 10 and 20 facing each other, a liquid crystal layer 25 filled between the first and second substrates 10 and 20, a color filter layer formed on the second substrate 20, and a first polarizing plate 31 and a second polarizing plate 32 formed on outer surfaces of the first and second substrates 10 and 20, respectively.

Also, the touch and three-dimensional image display panel 80 includes a fourth substrate (upper substrate) 82 provided with electrodes 83 and 86 for sensing touch and electrodes 91a and 91b for realizing three-dimensional images, a third substrate (lower substrate) 81 provided with a black matrix layer 87 and a common electrode 93, and a liquid crystal layer 90 filled between the third and fourth substrates 81 and 82. Here, the fourth substrate 82 is formed of a tempered glass substrate.

A black matrix layer 87 is formed on the third substrate 81, and an over-coating layer 88 is formed over the entire surface of the substrate including the black matrix layer 87, a transparent common electrode 93 for realizing three-dimensional images is formed on the over-coating film 88 and a column spacer 89 is formed on the common electrode 93.

Electrodes 83 and 86 for sensing touch are formed on the fourth substrate 82 of the touch and three-dimensional image display panel 80, and electrodes 91a and 91b for realizing three-dimensional images are formed on the electrodes 83 and 86. In this case, the respective electrodes 83, 86, 91a, and 91b are electrically isolated from one another through the protective films 92a, 92b and 84.

Here, the electrodes for sensing touch are formed by a method which is different from that of the first to third embodiments.

That is, in order to provide the liquid crystal display device having touch and three-dimensional display functions, suitable for the narrow bezel model, a plurality of routing lines 111a and 111b for sensing touch are formed in a display region and a plurality of touch electrodes 83 and 86 are formed in the routing lines such that they correspond to one-to-one the routing lines.

When 160 routing lines 111a and 111b are formed, 160 touch electrodes are also formed.

The third substrate 81 and the fourth substrate 82 are joined to each other through a sealant (not shown) such that they face each other, and a liquid crystal layer 90 is formed between the third and fourth substrates.

The third substrate 81 of the touch and three-dimensional image display panel 80 and the liquid crystal panel 50 are adhered through the adhesive 55.

A method for manufacturing a liquid crystal display device having touch and three-dimensional display functions according to the fourth embodiment of the present invention will be described in detail.

FIG. 9A to 9G are a plan view and a sectional view illustrating the method for manufacturing the liquid crystal display device having touch and three-dimensional display functions according to the fourth embodiment of the present invention, and specifically, a plan view and a sectional view illustrating a process of a upper substrate (fourth substrate) of the touch and three-dimensional image display panel.

Figure 9A:
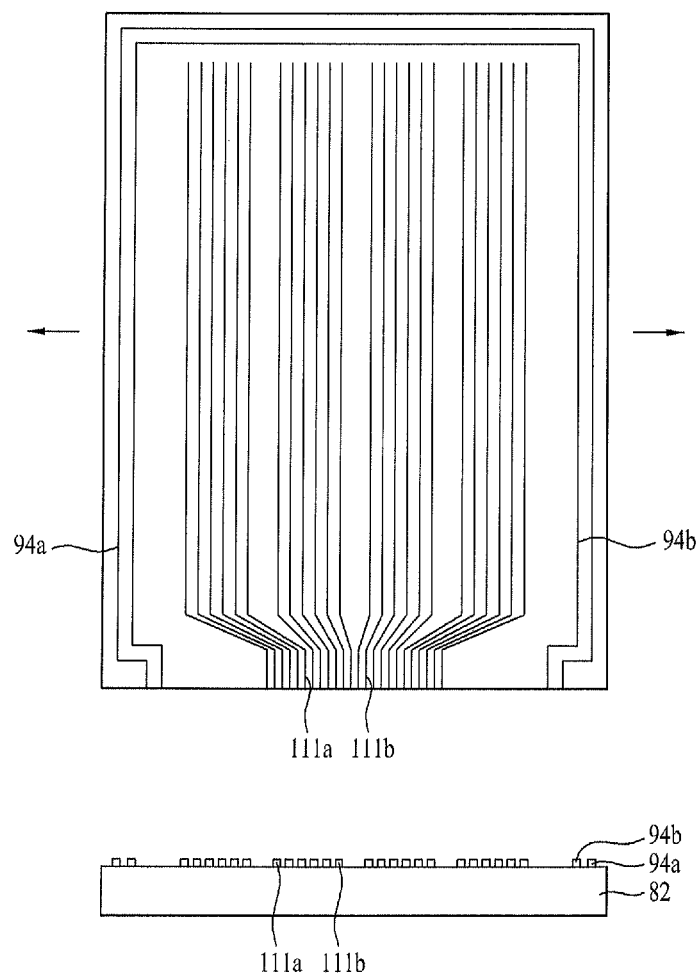
FIG. 9A to 9G are a plan view and a sectional view illustrating a method for manufacturing the liquid crystal display device having touch and three-dimensional display functions according to the fourth embodiment of the present invention, and specifically, a plan view and a sectional view illustrating a process of an upper substrate (fourth substrate) of the touch and three-dimensional image display panel.

As shown in FIG. 9A, a plurality of routing lines 94a and 94b for realizing three-dimensional images are formed on the edge of the fourth substrate 82 of the touch and three-dimensional image display panel 80, and a plurality of routing lines 111a and 111b for sensing touch are formed in the center thereof corresponding to a display region.

Figure 9B:
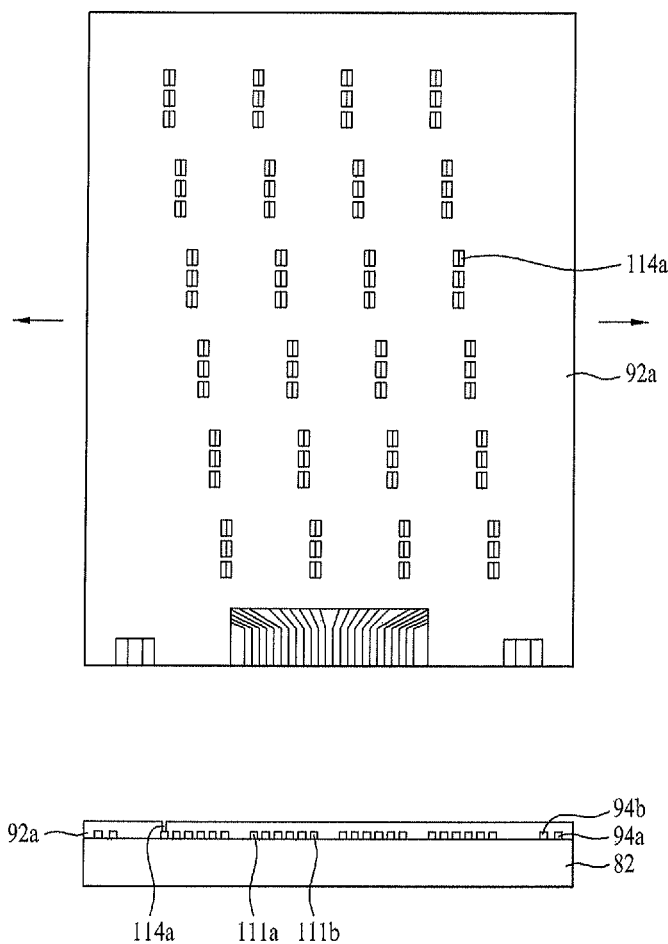

As shown in FIG. 9B, a protective film 92a is formed over the entire surface of the fourth substrate 82 including the routing lines 94a, 94b, 111a and 111b, and is then selectively removed through an etching process using a mask the protective film 92a to form a plurality of contact holes 114a in the respective routing lines 111a and 111b for sensing touch.

Figure 9C:
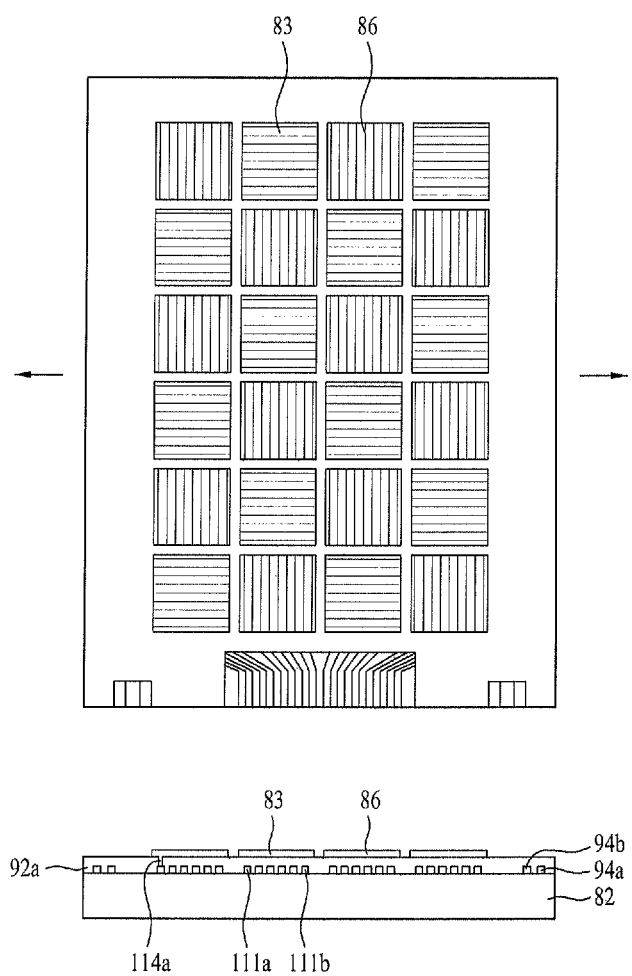

As shown in FIG. 9C, a transparent conductive layer is deposited the protective film 92a including the contact holes 114a and is then selectively removed to form a plurality of electrodes 83 and 86 for sensing touch such that they are electrically connected to the respective routing lines 111a and 111b through the contact holes 114a.

Figure 9D:
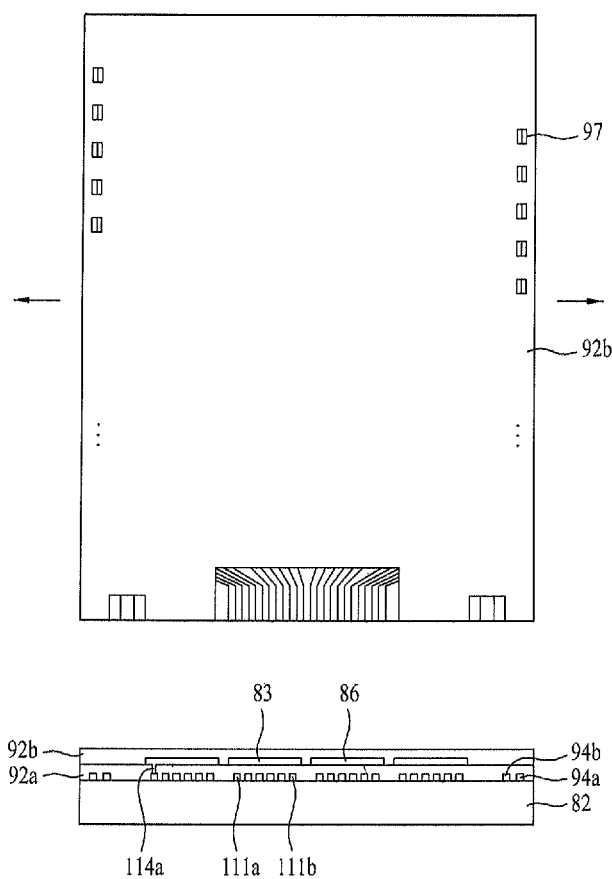

As shown in FIG. 9D, a protective film 92b is formed over the entire surface of the substrate and is selectively removed through an etching process using a mask the protective film 92b to form a plurality of contact holes 97 in the routing line 94a among the routing lines 94a and 94b for displaying three-dimensional images.

Figure 9E:
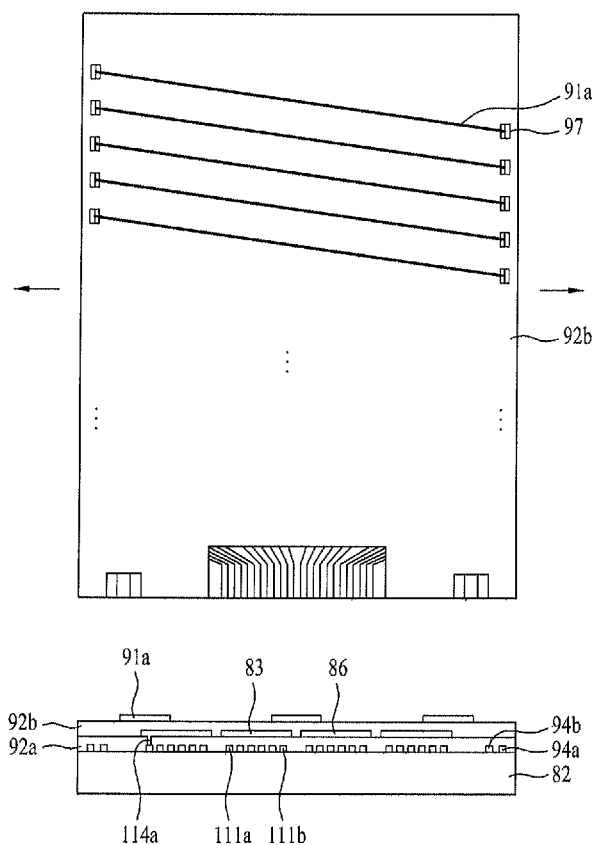

As shown in FIG. 9E, a transparent conductive layer is deposited over the protective film 92b and is then selectively removed to form a plurality of even electrodes 91 such that they are electrically connected to the routing line 94a through the contact holes 97.

Figure 9F:
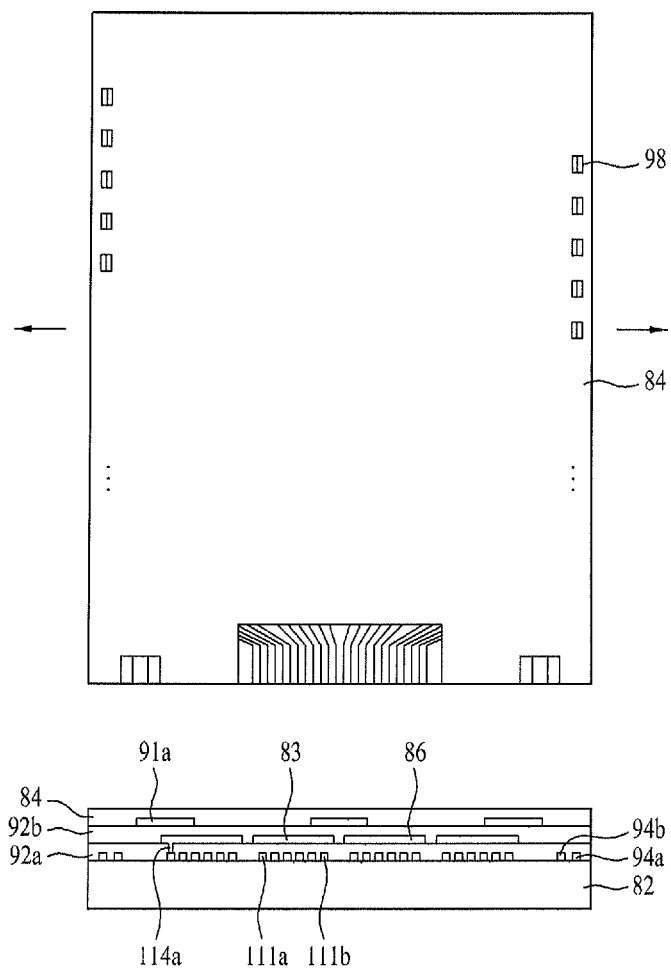

As shown in FIG. 9F, a protective film 84 is formed over the entire surface of the protective film 92b including the even electrodes 91a and is then selectively removed through an etching process using a mask, to form a plurality of contact holes 98 in the routing line 94b.

Figure 9G:
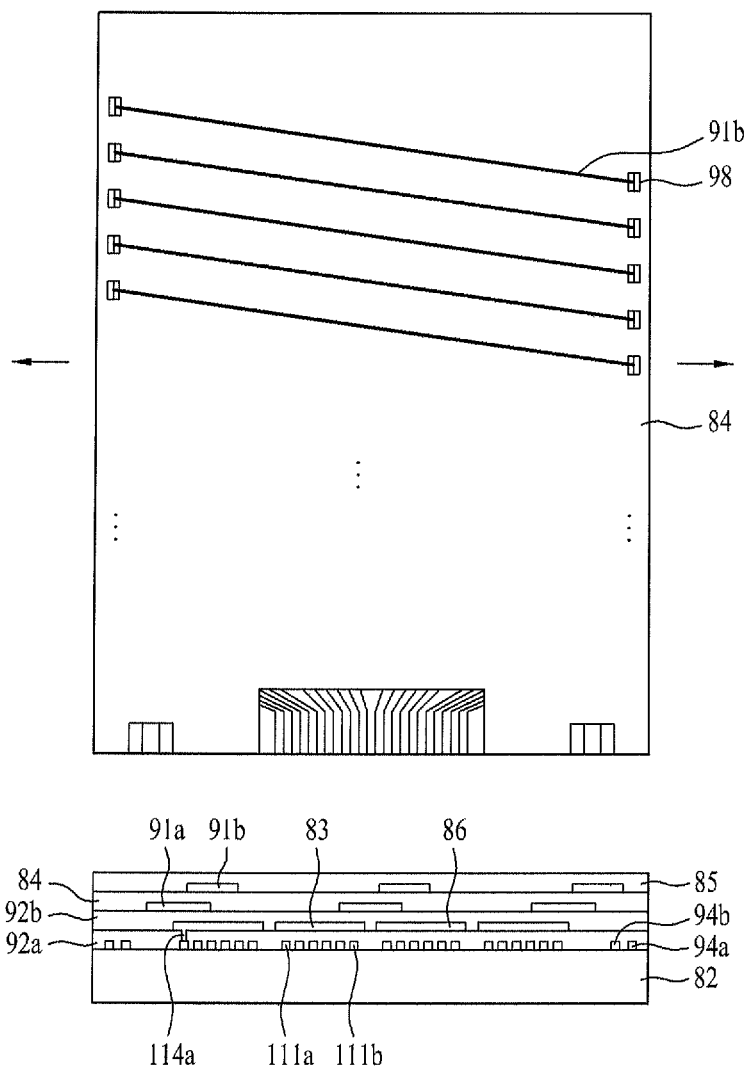

As shown in FIG. 9G, a transparent conductive layer is deposited on the protective film 84 including the contact holes 98 and is selectively removed, to form a plurality of odd electrodes 91b such that they are electrically connected to the routing line 94b through the contact holes 98. Also, an insulating film 85 is formed over the entire surface of the resulting structure.

Also, as shown in FIG. 8, a black matrix layer 87 is formed on the lower substrate (third substrate) 81 of the touch and three-dimensional image display panel, an over-coating layer 88 is formed on the substrate 81 including the black matrix layer 87, a transparent common electrode 93 for realizing three-dimensional images is formed on the over-coating layer 88 and a column spacer 89 is formed on the common electrode 93.

The third substrate 81 and the fourth substrate 82 thus formed are joined to each other using a sealant (not shown) such that the third substrate 81 faces the fourth substrate 82, and a liquid crystal layer 90 is formed between the third and fourth substrates to complete formation of the touch and three-dimensional image display panel.

Also, the touch and three-dimensional image display panel 8 is adhered to the liquid crystal panel 95 through an adhesive 55.

Fifth Embodiment

The first to fourth embodiments illustrate examples in which the fourth substrate (upper substrate) is formed of a tempered glass substrate.

However, the present invention is not limited to these examples. For example, rigidity of a substrate can be secured by using a polarized glass substrate, instead of the tempered glass substrate, and hard-coating the upper surface of the polarized glass substrate.

Also, instead of the hard coating, a tempered glass substrate may be adhered to the polarized glass substrate through an adhesive. That is, in order to prevent an increase in size, the polarized glass substrate is etched and a tempered glass substrate is adhered thereto.

The electrode for sensing touch may have a configuration shown in FIG. 4D, or may have a configuration, as shown in FIGS. 7C and 7D.

As apparent from the fore-going, the liquid crystal display device having touch and three-dimensional display functions and a method for manufacturing the same according to the present invention have the following advantages.

A three-dimensional image display panel includes electrodes for sensing touch, thus eliminating the necessity of separate electrodes for touch panels and decreasing a weight and thickness of the liquid crystal display device. Also, only one adhesive is used, thus simplifying the overall manufacture process and reducing manufacture costs.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising a touch and three-dimensional image display panel adhered to a liquid crystal panel through an adhesive layer, wherein the touch and three-dimensional image display panel comprises:

an upper substrate provided with third and fourth electrodes which sense touch along an X-axis and an Y-axis, respectively, and first and second electrodes which realize a three-dimensional image;

a lower substrate provided with a single layer of common electrode which realizes the three-dimensional image; and a liquid crystal display filled between the upper and lower substrates.

2. The liquid crystal display device according to claim 1, the upper substrate further comprises: a plurality of routing lines which sense touch, and routing lines which realize a three-dimensional image, and, wherein the routing lines for realizing a three-dimensional image are disposed on an edge of the upper substrate, the routing lines which sense touch are disposed in the center thereof, and the third and fourth electrodes which sense touch correspond with one-to-one to the plurality of routing lines for sensing touch.

3. The liquid crystal display device according to claim 1, wherein the upper substrate is formed of a tempered glass substrate.

4. The liquid crystal display device according to claim 1, wherein the upper substrate or the lower substrate further comprises a black matrix layer.

5. The liquid crystal display device according to claim 1, wherein the upper substrate is formed of a polarized glass substrate having a hard-coated surface.

* * * * *